United States Patent [19]

Keck et al.

[11] Patent Number: 5,189,600
[45] Date of Patent: Feb. 23, 1993

[54] COMBINED POWER SUPPLY FOR MAIN AND STAND-BY POWER

[75] Inventors: Gregory W. Keck; Robert L. Lyle, Jr., both of Knoxville, Tenn.

[73] Assignee: North American Philips Corporation, New York, N.Y.

[21] Appl. No.: 810,247

[22] Filed: Dec. 19, 1991

[51] Int. Cl.⁵ .................. H02M 3/335; H04N 5/63
[52] U.S. Cl. .................. 363/212; 358/190; 323/270; 323/351
[58] Field of Search .............. 363/18, 19, 100, 17, 363/16, 20, 21; 323/225, 270, 269, 350, 351, 349; 315/411; 358/190

[56] References Cited

U.S. PATENT DOCUMENTS 4,027,227  5/1979  Engel .......................... 323/222
4,614,906  9/1986  Maxham ....................... 323/267
4,636,713  1/1987  Stefani ........................ 323/350
4,656,573  4/1987  Lee ............................ 363/49

Primary Examiner—Steven L. Stephan
Assistant Examiner—Ben Davidson
Attorney, Agent, or Firm—Edward W. Goodman

[57] ABSTRACT

A power supply includes a main power supply section having power dissipating components therein and a stand-by power supply section. When the main power supply section is off, the stand-by power supply section uses the power dissipating components in the main power supply section to dissipate waste power. When the main power supply section is on, power from a secondary power supply driven by the output from the main power supply section is used to drive the stand-by power supply section thereby reducing any power dissipating requirements of the stand-by power supply section.

6 Claims, 2 Drawing Sheets

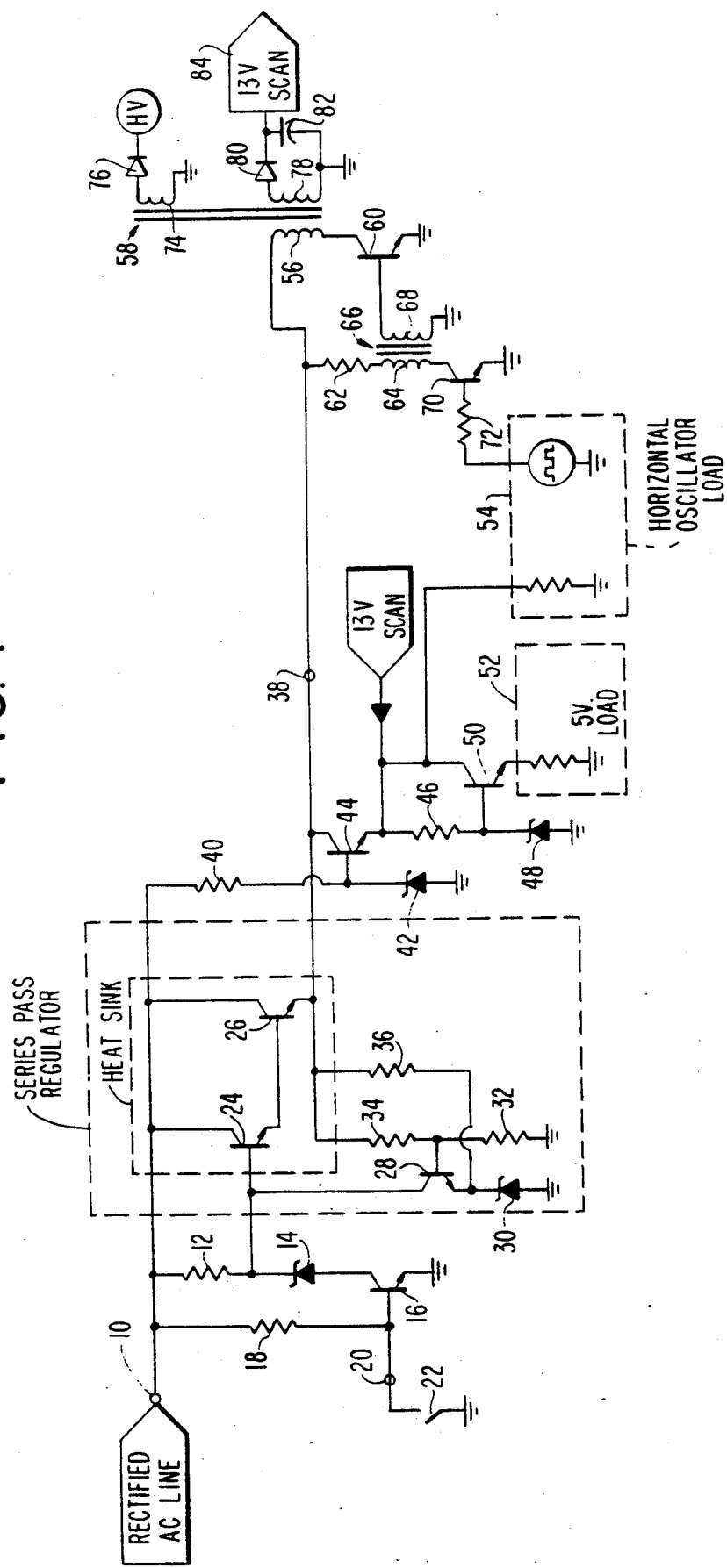

COMBINED POWER SUPPLY FOR MAIN AND STAND-BY POWER

BACKGROUND OF THE INVENTION

1. Field of The Invention

The present invention relates to television receivers and to circuitry for supplying power to the various circuits in the television receiver.

2. Description of The Related Art

A television receiver typically has three types of power supplies. As shown in FIG. 1, a main power supply receives a rectified AC line voltage (130V to 185V) and provides a relatively high regulated voltage (130 Volts) with high currents (1 Amp.) to the main loads. One of the loads on the main power supply is a secondary power supply that generates high voltage (30 KV) for the picture display tube and a variety of secondary voltages (5V, 12V, 24V, etc.) for energizing various of the circuits within the television receiver. The third power supply is the "stand-by" power supply which supplies power to the television receiver's microprocessor (and in some cases to the horizontal oscillator) both when the television receiver is "ON", and when it is "OFF". The input voltage to the stand-by power supply is usually the rectified AC line voltage and the output voltage is typically 5 Vdc to 12 Vdc. This high input voltage and low output voltage requires either a switched mode power supply or a very low efficiency series pass regulator.

A typical switched mode power supply (shown in FIG. 2) can provide large amounts of power but is relatively complex and costly even at very low power outputs. Conversely, a typical series pass regulator (shown in FIG. 3) is very low cost but is very inefficient (typically 4%). The waste power (5-10 Watts) is usually dissipated in large resistors in series with the pass element. These resistors take up space, heat other parts (whether the television receiver is "ON" or "OFF") and limit the power available from the stand-by power supply.

SUMMARY OF THE INVENTION

It is an object of the present invention to provide a power supply which supplies both main and stand-by power while using less space and is less costly than the dual power supplies of the prior art.

The above object is achieved in a power supply having an input section for supplying an input voltage and a control voltage, and a main power supply section coupled to receive said input voltage and said control voltage from said input section, said main power supply section including a series pass regulator having heat dissipating components, and an output for supplying a first output voltage, characterized in that said power supply further comprises:

a stand-by power supply section coupled to the output of said main power supply section for providing at least one stand-by voltage; and means coupled to said input section for selectively reducing said control voltage therefrom thereby causing said main power supply section to provide a second output voltage substantially lower than said first output voltage, excessive power being dissipated in said heat dissipating components of said main power supply section, and said second output voltage being sufficient for said stand-by power supply section to operate properly.

BRIEF DESCRIPTION OF THE DRAWINGS

With the above objects and advantages in mind as will hereinafter appear, the invention will be described with reference to the accompanying drawings, in which:

FIG. 4 is a block schematic diagram of the power supply of the subject invention incorporated in a television receiver.

DESCRIPTION OF PREFERRED EMBODIMENTS

Figure 1:
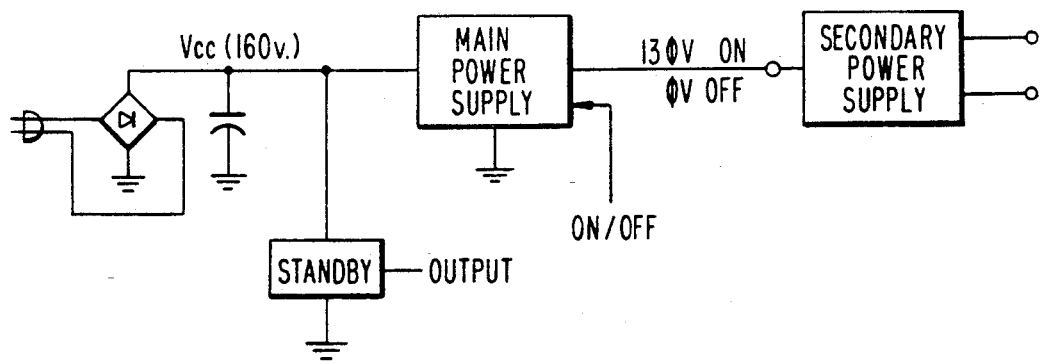
FIG. 1 is a block schematic diagram of a typical power supply section in a television receiver.
Figure 2:
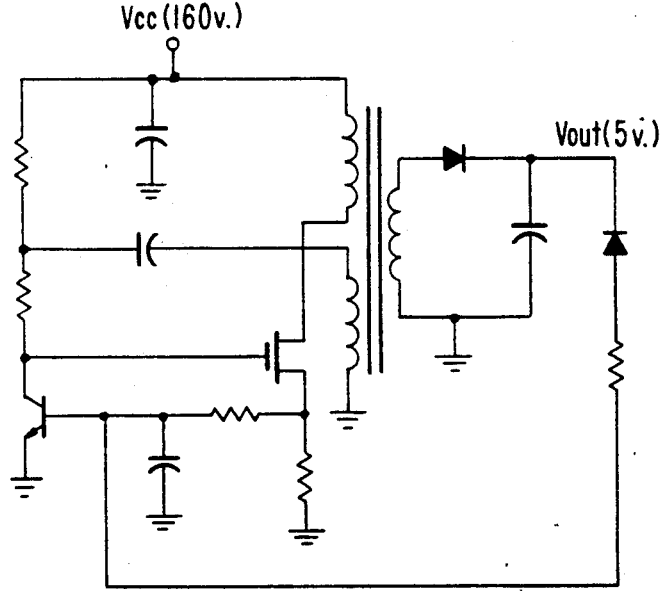
FIG. 2 is a schematic diagram of a typical switched mode stand-by power supply.
Figure 3:
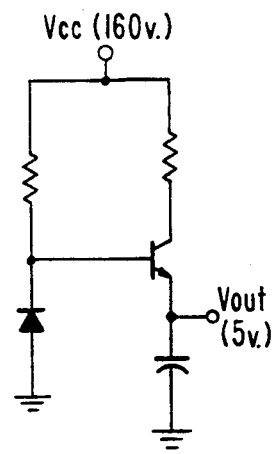
FIG. 3 is a schematic diagram of a typical series pass stand-by power supply.

As shown in FIG. 4, the power supply of the subject invention receives the rectified AC line voltage at input 10. The series arrangement of a resistor 12, a 15 v. zener diode 14 and the collector-emitter path of a first control transistor 16 connect the input 10 to ground. The base of the first control transistor 16 is connected to the input 10 by a resistor 18 and receives an ON/OFF control signal at input 20. As shown in FIG. 4, this control signal may be merely formed by a switch 22 selectively connecting the input 20 to ground such that the main power supply section (to be described below) of the power supply is turned off when the switch 22 is opened, and conversely, the main power supply section is turned on when the switch 22 is closed. The elements 10-22 form an input section for the power supply of the subject invention.

A pair of transistors 24 and 26, in a Darlington arrangement, are mounted in a heat sink and have their collectors connected to the input 10. The emitter of transistor 24 is connected to the base of transistor 26 and the base of transistor 24 is connected to the junction between the resistor 12 and the zener diode 14. The base of transistor 24 is further connected to the collector of a transistor 28, the emitter of which is connected to ground by a zener diode 30. The base of transistor 28 is connected to ground by a resistor 32 and is also connected to the output 38 of the power supply by a resistor 34. The emitter of transistor 26 is directly connected to the output 38 while the emitter of transistor 28 is connected to the output 38 by resistor 36. The elements 24-38 form the main power supply section of the power supply and are arranged as essentially a series pass regulator.

A series arrangement of a resistor 40 and a 10 v. zener diode 42 connect the input 10 to ground. The junction between the resistor 40 and the zener diode 42 is connected to the base of a second control transistor 44 having a collector connected to the output 38. The emitter of transistor 44 is connected to ground by the series arrangement of a resistor 46 and a 5.6 v. zener diode 48, and is also connected to the collector of a transistor 50, the base of which is connected to the junction between the resistor 46 and the diode 48. The emitter of the transistor 50 forms the 5 v. output of the stand-by power supply section and is shown connected to ground through a 5 v. resistive load 52. The emitter of the transistor 44 forms a 9 v. output of the stand-by power supply section and is shown connected to ground through the horizontal oscillator (resistive) load 54. The elements 40-54 form the stand-by power supply section of the power supply and is also essentially a series pass regulator.

The output 38 of the power supply is shown connected to one end of the primary winding 56 of a flyback transformer 58, the other end of the primary winding 56 being connected to ground through the collector-emitter path of a horizontal output transistor 60. The output 38 is also connected by a resistor 62 to the primary winding 64 of a driver transformer 66, the secondary winding 68 of which is connected to the base of the horizontal output transistor 60. The other end of the primary winding 64 of the driver transformer 66 is connected to ground by the collector-emitter path of a driver transistor 70, the base of which is connected by a resistor 72 to receive a signal from the horizontal oscillator.

One secondary winding 74 of the flyback transformer 58 supplies, via a diode 76, the high voltage for the display tube (not shown), while another secondary winding 78 of the flyback transformer 58 is connected to ground by the series arrangement of a diode 80 and a capacitor 82, the junction between the diode 80 and the capacitor 82 providing a 13 v. scan voltage output 84. The elements 56-84 form a secondary power supply, supplied by the power supply of the subject invention. As shown in FIG. 4, the output 84 of the secondary power supply is connected through a diode 86 to the emitter of the second control transistor 44.

In operation, when the television receiver is on, switch 22 is closed causing the first control transistor 16 to turn off. This allows the transistor 28 to control the voltage applied to the base of transistor 24 resulting in the output 38 of the power supply carrying its regulated 130 volts. Initially, this high voltage at the input of the stand-by power supply section results in excessive power dissipation in the second control transistor 44. However, upon energizing of the secondary power supply by the 130 v. regulated output 38 of the power supply, the 13 v. scan voltage output 84 therefrom connected to the emitter of the second control transistor 44 fully cuts off this transistor 44 and the output 84 then supplies the power for the stand-by power supply section. Now when the television receiver is off, switch 22 is open causing base of the first control transistor 16 to receive a control signal through the resistor 18. This turns on the first control transistor 16 thereby dropping the control voltage being applied to the base of transistor 24 to approximately 16 volts. This drops the voltage on the output 38 of the power supply to approximately 15 volts. This regulated output of 15 volts is too low to turn on the horizontal output transistor 60 and as such, the secondary power supply remains off. However, this regulated 15 volts is sufficient to drive the stand-by power supply through the second control transistor 44. It should be understood that the power lost from dropping the rectified input voltage to the regulated 15 volts is dissipated in the transistors 24 and 26 of the main power supply section. Hence, no additional heat dissipating components are required in the stand-by power supply section thereby resulting in a saving of space and cost.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A power supply having an input section for supplying an input voltage and a control voltage, and a main power supply section coupled to receive said input voltage and said control voltage from said input section, said main power supply section including a series pass regulator having heat dissipating components, and an output for supplying a first output voltage, said power supply further comprising:
   a stand-by power supply section coupled to the output of said main power supply section for providing at least one stand-by voltage; and
   means coupled to said input section for selectively reducing said control voltage therefrom thereby causing said main power supply section to provide a second output voltage substantially lower than said first output voltage, excessive power being dissipated in said heat dissipating components of said main power supply section, and said second output voltage being sufficient for said stand-by power supply section to operate properly, characterized in that said power supply further comprises a secondary power supply coupled to the output of said main power supply section for proving a secondary output voltage only when said main power supply section is providing said first output voltage, said secondary output voltage being applied to said stand-by power supply section to limit power dissipation in said stand-by power supply section when said main power supply section is providing said first output voltage.

2. A power supply as claimed in claim 1, characterized in that said stand-by power supply section comprises a series arrangement of a control element and a series pass regulator, said control element having an input coupled to the output of said main power supply section and an output coupled to said series pass regulator of said stand-by power supply section, said secondary output voltage being applied to the output of said control element thereby effectively turning off said control element when said main power supply section is providing said first output voltage, thereby limiting power dissipation in said control element.

3. A power supply as claimed in claim 2, characterized in that said control element comprises a transistor having a collector connected to the input, an emitter connected to the output, and a base; and a series arrangement of a resistor and a zener diode coupling said input voltage of said main power supply section to ground, a junction between said resistor and said zener diode being connected to the base of said transistor.

4. A power supply as claimed in claim 1, characterized in that said power dissipating components in said series pass regulator in said main power supply section comprise a first transistor having a base for receiving said control voltage from said input section, a collector coupled to receive said input voltage and an emitter; and a second transistor having a base coupled to the emitter of said first transistor, a collector also coupled to receive said input voltage, and an emitter coupled to the output of said main power supply section.

5. A power supply having an input section for supplying an input voltage and a control voltage, and a main power supply section coupled to receive said input voltage and said control voltage from said input section, said main power supply section including a series pass regulator having heat dissipating components, and an output for supplying a first output voltage, said power supply further comprising:

a stand-by power supply section coupled to the output of said main power supply section for providing at least one stand-by voltage; and means coupled to said input section for selectively reducing said control voltage therefrom thereby causing said main power supply section to provide a second output voltage substantially lower than said first output voltage, excessive power being dissipated in said heat dissipating components of said main power supply section, and said second output voltage being sufficient for said stand-by power supply section to operate properly, characterized in that said input section and said means for selectively reducing the control voltage from said input section comprise:

an input for receiving a rectified AC line voltage, said input being coupled to an output of said input section for supplying said input voltage;

a series arrangement coupling said input to ground said series arrangement including resistor having one end connected to said input, a zener diode having one end connected to another end of said resistor forming a junction at which said control voltage for said main power supply section is provided, and a control transistor having a collector connected to another end of said zener diode, an emitter connected to ground, and a base; and means for selectively applying a control current to the base of said control transistor, whereby when said control current is applied to the base of said control transistor, said control voltage is reduced to substantially that of said zener diode thereby causing said main power supply section to generate said second output voltage.

6. A power supply as claimed in claim 5, whereby said means for selectively applying a control current comprises a resistor connected between said input and the base of said control transistor, and a switch selectively connecting the base of said control transistor to ground.

* * * * *